United States Patent
Morimoto et al.

(10) Patent No.: US 6,254,021 B1
(45) Date of Patent: Jul. 3, 2001

(54) CENTRIFUGAL BRAKING DEVICE FOR DOUBLE BEARING REEL

(75) Inventors: Shin'ichi Morimoto, Nishinomiya; Ken'ichi Kawasaki, Sakai, both of (JP)

(73) Assignee: Shimano Inc., Sakai (JP)

( * ) Notice: Subject to any disclaimer, the term of this patent is extended or adjusted under 35 U.S.C. 154(b) by 0 days.

(21) Appl. No.: 09/510,342

(22) Filed: Feb. 22, 2000

(30) Foreign Application Priority Data

Feb. 25, 1999 (JP) ................................................. 11-047705

(51) Int. Cl.[7] ................................................... A01K 89/02
(52) U.S. Cl. ....................... 242/289; 242/301; 188/181 A
(58) Field of Search .................................. 242/285, 286, 242/289, 301, 303, 309; 188/181 A, 184, 185, 187

(56) References Cited

U.S. PATENT DOCUMENTS

| | | |
|---|---|---|
| 5,308,021 | 5/1994 | Ikuta . |
| 5,362,011 * | 11/1994 | Sato ..................................... 242/289 |
| 5,372,324 * | 12/1994 | Sato ..................................... 242/289 |
| 5,803,385 * | 9/1998 | Baisch ................................. 242/289 |
| 5,865,387 | 2/1999 | Hirano . |
| 5,984,221 * | 11/1999 | Kim ..................................... 242/289 |
| 5,996,921 * | 12/1999 | Hogaki et al. ....................... 242/289 |
| 6,126,105 * | 10/2000 | Yamaguchi .......................... 242/289 |

FOREIGN PATENT DOCUMENTS 1198301A 11/1998 (CN) .

* cited by examiner

*Primary Examiner*—Emmanuel M. Marcelo
(74) *Attorney, Agent, or Firm*—Shinjyu Intellectual Property Firm

(57) ABSTRACT

A centrifugal braking mechanism is a device for braking a spool that is rotatably supported in a reel body. The braking mechanism uses centrifugal forces in order to produce braking force against rotation of the spool. The braking mechanism includes a plurality of brake members, a brake housing having a cylindrically shaped brake liner, and an adjusting mechanism. Each of the plurality of brake members is configured to move in a radially outward direction relative to the spool in response to rotation of the spool. The brake housing and brake liner are moveable in an axial direction relative to the spool and brake members such that any selected number of the brake members may contact the brake liner to generate the braking force. The adjusting mechanism is used to selectively move the brake housing and brake liner into any of a plurality of axial positions thereby determining the number of brake members that are contactable with the brake liner in response to centrifugal force. The level of braking force desired is determined by the number of brake members that may contact the brake liner.

12 Claims, 7 Drawing Sheets

CENTRIFUGAL BRAKING DEVICE FOR DOUBLE BEARING REEL

BACKGROUND OF THE INVENTION

1. Field of the Invention

The present invention relates to a centrifugal braking device. More specifically, the present invention relates to a centrifugal braking device for double bearing reel that is configured for providing braking force to a spool that is rotatably supported in a reel body of a double bearing reel, the centrifugal braking device working in response to centrifugal forces.

2. Background Information

A double bearing reel is mainly used for lure fishing and is also referred to as a bait reel. In such a double bearing reel, braking force is typically applied to the spool in order to prevent the generation of backlash caused when the rotation speed of a spool exceeds the releasing speed of a fishing line during a casting operation. A centrifugal braking device is one braking mechanism used for reducing backlash and is capable of braking the spool using centrifugal forces generated when the spool is rotated.

In general, centrifugal braking devices include a plurality of brake members and a brake housing. The plurality of brake members are provided movably in a radial direction with respect to the spool or a rotating member which rotates together with the spool. The brake housing is a member having a cylindrical shape which is fixed to a reel body. The brake housing is disposed outside of the brake members so as to be capable of making contact with the brake members.

In such a centrifugal braking device, when the spool rotates, the brake members are urged radially outwardly in centrifugal forces and make contact with a braking surface thereby braking rotation of the spool. Since the centrifugal force increases proportional to the square of the rotation speed of the spool, the generated braking force is not large when the spool rotates at a low speed as, for instance, when winding a fishing line around the spool. However, the generated braking force becomes significantly large when the spool is rotated at high speed as, for instance, during casting out of the fishing line. For this reason, the centrifugal braking device has a characteristic that although resistance generated during a fishing line winding operation is small, a large braking force may be generated when casting a fishing line to prevent backlash.

In this kind of centrifugal braking device, the number of brake members which move in the radial direction may be varied in order to adjust the level of the braking force. For this reason, a rocking mechanism is provided with each of the brake members in order to switch the respective brake member from an operating position where the brake member may make contact with the brake housing, to a nonoperating position where the brake member does not make contact with the brake housing.

When, for instance, lure fishing is performed using a bait reel having the above described centrifugal braking device and lures of various weights such as a plug and a worm are used, the distance that a lure may be cast out varies depending on the weight of the lure. Thus, it is preferable, when lures of various weights are used, that the braking force be adjustable in accordance with the weight of the lure.

In the conventional centrifugal braking devices described above, since the brake members move in the radial direction (the same direction as the centrifugal forces operate), a large braking force may be obtained. However, it is necessary to adjust the braking force by increasing or decreasing the number of the brake members which make contact with the brake housing using the rocking member provided with the respective brake member. Accordingly, it is difficult to adjust the braking force.

Japanese Laid-Open patent application No. 10-304798 discloses a centrifugal braking device in which an adjustment of the braking force may be carried out by touching a dial exposed outside of a reel body.

The above centrifugal braking device includes a rotating member, a plurality of brake members, a brake housing, and a moving mechanism. The rotating member rotates together with the spool. The plurality of brake members are movably supported by the rotating member. The brake housing is provided on the reel body so as to reciprocate in the spool axis direction. The tip of the respective brake members may make contact with the brake housing. The moving mechanism includes the rotary dial and it reciprocates the brake housing. A contacting portion is formed at a tip of the respective brake member for making contact with the brake housing. The brake housing is a disc-shape member provided with a ring-shape brake shoe at its periphery which makes contact with the contacting portion. The brake housing reciprocates in the spool axis direction when the dial of the moving mechanism is rotated.

In the above-mentioned conventional centrifugal braking device, the brake members are moved radially outwardly with respect to the spool axis when the spool is rotated due to the centrifugal force exerted on the brake members such that the brake members make contact with the brake shoe to brake the spool. The braking force may be adjusted by rotating the dial to move the brake housing such that an angle of each respective brake member is varied when it makes contact with the brake shoe.

Although the adjustment of the braking force may be easily carried out by rotating the dial in the above conventional centrifugal braking device, a large braking force is hardly obtained since the braking force which is exerted upon making contact with the brake shoe is obtained by the force of the movement of the brake members outwardly in the axial direction. That is, since the brake members move outwardly in the axial direction, not outwardly in the radial direction, it is difficult to efficiently obtain a centrifugal force which acts in the radial direction as a braking force. Moreover, since the braking force is adjusted by varying the angle of the respective brake member, the change in the braking force when the brake housing is moved in the spool axis direction is small and, hence, one can hardly feel a distinctive change in the braking force.

SUMMARY OF THE INVENTION

Accordingly, one object of the present invention is to provide a centrifugal braking device for a double bearing reel in which braking force is easily adjusted, a large braking force is obtainable, and distinctive differing levels in braking force are easily selected.

In accordance with one aspect of the present invention, there is a centrifugal braking device in a double bearing reel. The double bearing reel has a reel housing and a spool rotatably supported within the reel housing. The centrifugal braking device provides braking force to the spool in response to centrifugal forces and includes a plurality of circumferentially spaced apart brake members supported within the reel housing for rotator with the spool. The brake members are movable in a radially outward direction in response to centrifugal forces. Each of the plurality of brake members has a contact portion and each contact portion is located at a different position in an axial direction relative to the spool. The centrifugal braking device also includes a brake housing supported in the reel housing. The brake housing has a cylindrical shape and is non-rotatable with respect to the reel housing. The brake housing is selectively movable in the axial direction relative to the spool such that in a retracted position the brake housing is spaced apart from each of the contact portions such that none of the contact portions is contactable with the brake housing in response to centrifugal forces, and in a nonretracted position at least one of the contact portions is contactable with the brake housing for generating braking force in response to centrifugal forces. The centrifugal braking device also includes a means for selectively positioning the brake housing in a plurality of axial positions in the axial direction relative to the spool.

Preferably, the centrifugal braking device also includes a rotating member coupled to the spool for rotation therewith. The rotating member is formed with means for supporting the plurality of brake members such that at least a portion of each of the brake members is urged radially outward in response to centrifugal forces.

Preferably, each of the brake members are supported on a portion of the rotating member for pivotal movement.

Preferably, the means for selectively positioning the brake housing includes a rotatable ring member rotatably supported on the reel housing. The ring member has a first cam contacting a second cam on the brake housing such that rotation of the rotatable ring member changes the axial position of the brake housing relative to the spool. Further, an urging member contacts the brake housing for urging the brake housing in an axial direction away from the rotating member.

Preferably, the rotatable ring member is formed with a knob portion that extends in an axial direction, the knob portion extending through an opening in a side cover of the reel housing for operating the means for selectively positioning the brake housing.

Preferably, the means for supporting the plurality of brake members on the rotating member includes a plurality of concave portions formed in an axial face of the rotating member proximate a radially outer periphery thereof, a portion of each of the brake members being retained for pivotal movement in the concave portions.

Preferably, each of the concave portions includes angle controlling means for controlling angular displacement of each of the brake members with respect to pivotal movement thereof, such that radially outward movement of a tip end of each of the brake members is confined within a space defined by an inner radius of the brake housing.

Alternatively, the means for supporting the plurality of brake members on the rotating member includes a plurality of radially extending shafts fixed to the rotating member, and each of the brake members is disposed on a corresponding one of the shafts such that the brake members may undergo movement in radial directions relative to the spool and the brake members are confined against rotational movement with respect to the shafts.

Preferably, the brake housing includes a brake liner fixed to an inner radial surface of the brake housing, the brake liner for contacting the contact portions on each of the brake members.

In the above recited centrifugal braking device, the plurality of brake members move outwardly in the radial direction, not outwardly in an axial direction when the spool is rotated, and the contacting portions of the respective brake members contact the inner periphery of the brake housing so that a braking force is applied to the spool. The number of the contacting portions which make contact with the brake housing of cylindrical shape may be varied by moving the brake housing in the axial direction by using the altering the axial position of the brake housing. Since the location of each contact portion differs in the axial direction relative to the spool on each respective brake member, changes in the axial position of the brake housing changes the number of contact portions that may contact the brake housing for generating braking force. Since the number of the brake members which make contact with the brake housing may be readily changed by adjusting the axial location of the brake housing, the adjustment of the braking force is simple and easy. Also, since a braking of the spool is achieved by moving the brake members radially outward using centrifugal forces, a large braking force may be obtained. Moreover, since the adjustment in the braking force is carried out by changing the number of the contact portions which make contact with the brake housing, the braking force changes in a stepwise manner and a distinctive difference in the braking force may be obtained.

These and other objects, features, aspects and advantages of the present invention will become apparent to those skilled in the art from the following detailed description, which, taken in conjunction with the annexed drawing, discloses a preferred embodiment of the present invention.

BRIEF DESCRIPTION OF THE DRAWINGS

Referring now to the attached drawing which forms a part of this disclosure.

DETAILED DESCRIPTION OF THE
PREFERRED EMBODIMENT Overall Structure

Figure 1:
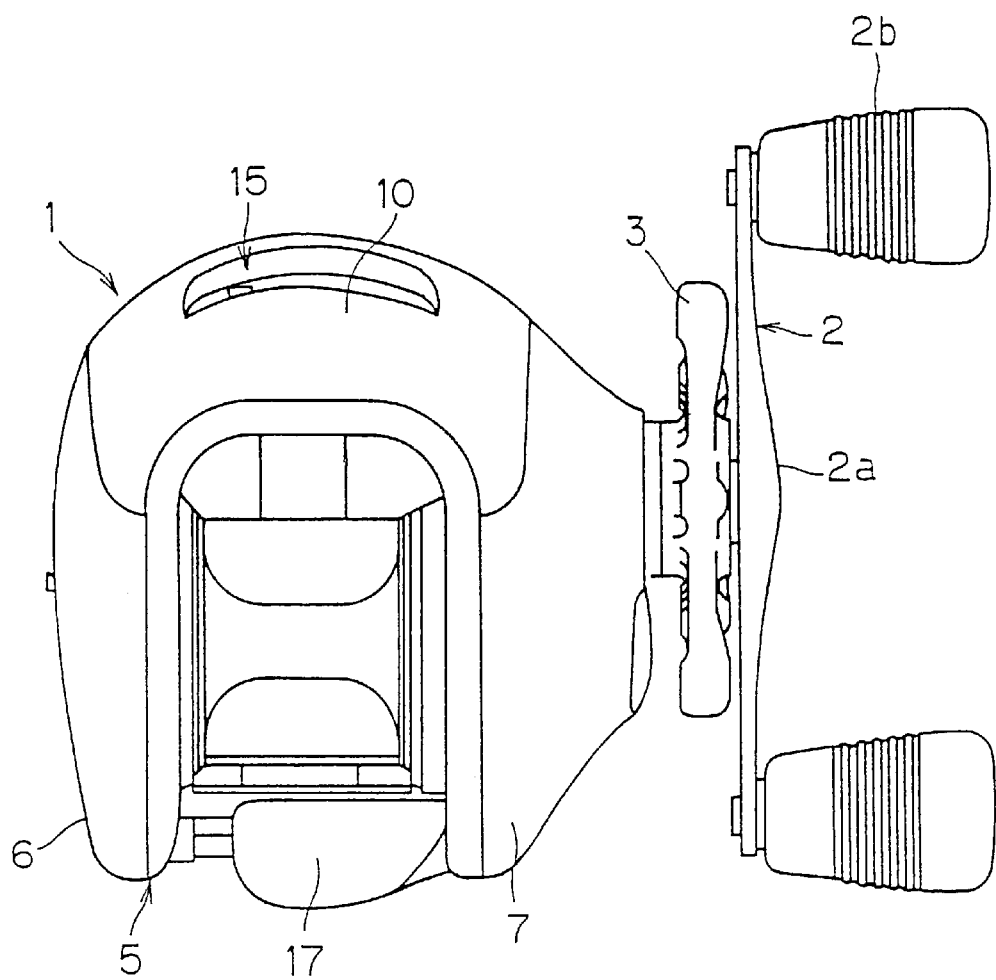
FIG. 1 is a plan view of a double bearing reel in accordance with one embodiment of the present invention.

FIG. 1 is a plan view of a double bearing reel in accordance with one embodiment of the present invention.

The double bearing reel shown in the FIG. 1 is a bait reel mainly used for a lure fishing and includes a reel body 1, a handle 2, and a star drag 3. The handle 2 is provided for rotating a spool and is disposed at one side of the reel body 1. The star drag 3 is disposed between the handle 2 and the adjacent side of the reel body 1. The handle 2 is of a double handle type which includes an arm portion 2a and holding portions 2b, each of which is rotatably provided with respective end of the arm portion 2a. The outer surface of the arm portion 2a of the handle 2 is a smooth jointless surface so that a fishing line is not likely to become entwined around the arm portion 2a.

Figure 2:
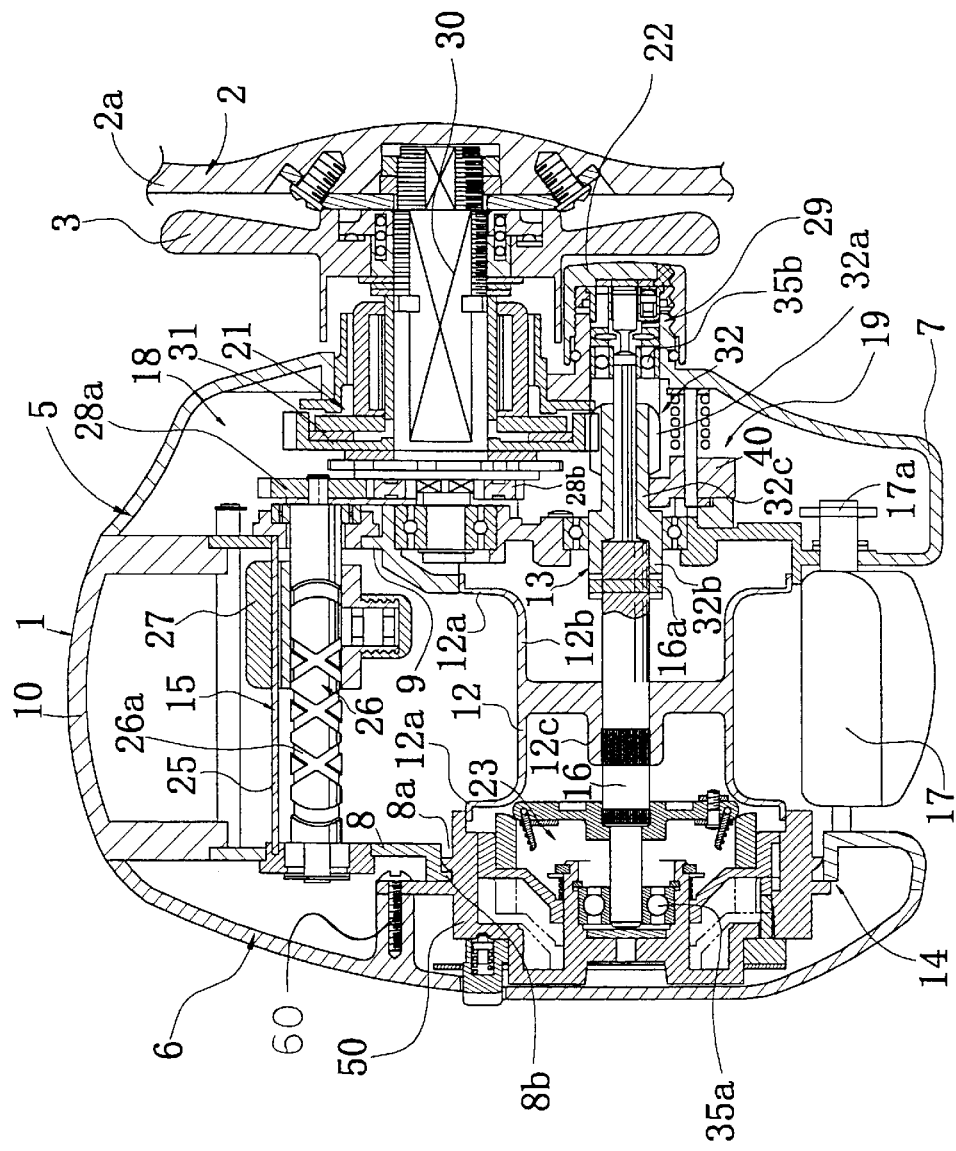
FIG. 2 is a cross-sectional view of the double bearing reel depicted in FIG. 1.

As shown in FIG. 2, the reel body 1 includes a frame 5, a first side cover 6, a second side cover 7, and a front cover 10. The first side cover 6 and the second side cover 7 are provided on respective opposite sides of the reel frame 5. The front cover 10 is disposed at a front portion of the frame 5 so as to be opened and closed. The frame 5 includes a pair of side plates 8 and 9, which are disposed so as to be opposed to each other with a space therebetween, and a plurality of connecting members (not shown) which connect the side plates 8 and 9.

The second side cover 7 is located on the same side of the frame 5 as the handle 2 and the second side cover 7 is fixed to the side plate 9 by, for instance, screws so that the side cover 7 is detachable from the side plate 9. The first side cover 6 is located on the opposite side of the reel body 1 from handle 2 and is attached to the side plate 8 by a bayonet structure 14 such that the first side cover 6 is detachable from the side plate 8, as is described in greater detail below. An opening 8a is formed in the side plate 8 such that a spool 12 extends there through.

Within the frame 5 are the following: the spool 12, a level wind mechanism 15, and a thumb rest 17. The level wind mechanism 15 is provided for uniformly winding a fishing line around the spool 12. The thumb rest 17 is shaped such that a fisherman's thumb may rest on the thumb rest 17 operation of the fishing reel. The thumb rest 17 is also serves as a clutch lever, as is described in greater detail below. A gear mechanism 18, a clutch mechanism 13, a clutch switching mechanism 19, a drag mechanism 21, and a casting control mechanism 22 are also provided in the space between the frame 5 and the second side cover 7.

The gear mechanism 18 is configured to transmit rotational force from the handle 2 to the spool 12 and to the level wind mechanism 15. The clutch switching mechanism 19 is configured to switch the clutch mechanism 13 from engagement to disengagement in response to pressing the thumb rest 17 downward. The drag mechanism 21 is configured to provide braking force to the spool 12 when the fishing line is released or cast out. The casting control mechanism 22 is configured to provide braking force to the spool 12 by engaging ends of a spool shaft 16. Further, a centrifugal braking mechanism 23 provided between the frame 5 and the first side cover 6 prevents backlash as the fishing line is cast out from the spool 12. Each of the above identified portions of the present invention are described in greater detail below.

The spool 12 is formed with flange portions 12a, each having a plate-like shape. The flange portions 12a are formed at both opposite sides of the spool 12. The spool 12 is also formed with a spool body 12b having a cylindrical shape. The spool body 12b extends between and are formed integrally with the flange portions 12a. The spool 12 has a boss portion 12c having a cylindrical shape that is integrally formed radially inward from the spool body 12b. The spool 12 is fitted to the spool shaft 16 with the spool shaft 16 extending through a central bore formed in the boss portion 12c. Specifically, the inner surface of the boss portion 12c and the shaft are formed with serrations or gear teeth such that the spool 12 and the spool shaft 16 are non-rotatable with respect to one another.

Figure 3:
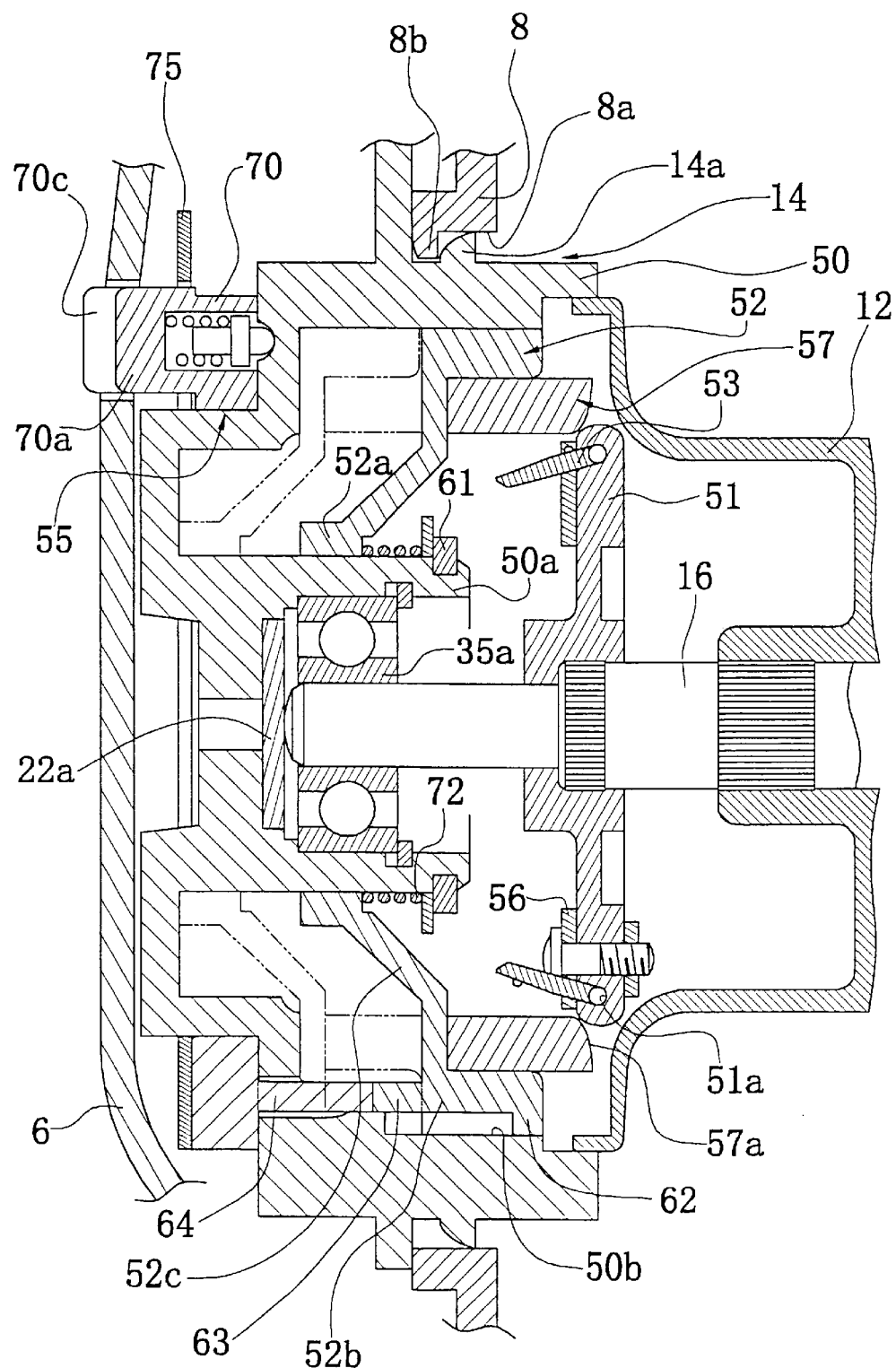
FIG. 3 is an enlarged cross-sectional view of a centrifugal braking mechanism of the double bearing reel depicted in FIGS. 1 and 2.

The spool shaft 16 extends through an opening formed in the side plate 9 and further extends outside of the second side cover 7. The second side cover is formed with a boss portion 29, as shown in FIG. 2. One end of the spool shaft 16 is rotatably supported by a bearing 35b retained within the boss portion 29. An opposite end of the spool shaft 16 is rotatably supported by a bearing 35a of the centrifugal braking mechanism 23, as shown in FIGS. 2 and 3.

The level wind mechanism 15 includes a guiding rod 25, a worm shaft 26, and a line guide 27. The guiding rod 25 is fixed to each of the side plates 8 and 9 and extends therebetween. The worm shaft 26 is supported at opposite ends on the side plates 8 and 9 extending parallel to and adjacent to the guiding rod 25. A gear 28a, which forms a part of the gear mechanism 18, is fixed to one end of the worm shaft 26. A spiral groove 26a is formed on the worm shaft 26. A guiding member (not shown) that is supported on the line guide 27 is engaged with the worm shaft by extending into the spiral groove 26a. For this reason, the line guide 27 undergoes reciprocating movement along the guiding rod 25 in response to rotation of the worm shaft 26 via the gear mechanism 18. A fishing line (not shown) extending through a guiding hole in the line guide 27 is thereby uniformly wound around the spool 12.

The gear mechanism 18 includes a main gear 31, a pinion gear 32, the above-mentioned gear 28a, and a gear 28b as shown in FIG. 2. The main gear 31 is fixed to a handle shaft 30. The pinion gear 32 has a cylindrical shape and engages with the main gear 31. The gear 28a is fixed to one end of the worm shaft 26. The gear 28b is fixed to the handle shaft 30 such that the gear 28b rotates with the handle shaft 30. The gear 28b is further engaged with the gear 28a.

The pinion gear 32 is generally a cylindrically shaped member that is extends along an outer periphery of a portion of one end of the spool shaft 16. The pinion gear 32 extends through an aperture formed in the side plate 9 such that most of the pinion gear 32 extends to an outward side of the side plate 9 (toward the right side in FIG. 2). The pinion gear 32 is engaged for rotation with the spool shaft 16 but may undergo movement in the axial direction along a portion of the length of the spool shaft 16.

The pinion gear 32 includes gear teeth portion 32a and an engaging portion 32b. The teeth portion 32a is located at right hand side of the reel body 1 shown in FIG. 2 for engagement with the main gear 31. The engaging portion 32b is formed at an opposite side of the pinion gear 32. A cylindrical portion 32c is provided between the teeth portion 32a and the engaging portion 32b.

A clutch pin 16a extends through a portion of the spool shaft 16, as shown in FIG. 2. The engaging portion 32b is formed with two recesses at radially opposite sides of the end surface of the pinion gear 32 for receiving the clutch pin 16a. When the pinion gear 32 is positioned as depicted in FIG. 2, there is engagement between engaging portion 32b of the pinion gear 32 and the spool shaft 16 such that rotation of the pinion gear 32 causes rotation of the spool shaft. The pinion gear 32 may also be moved outwardly (toward the right side of FIG. 2) such that the clutch pin 16a no longer engages the recesses formed in the end of the pinion gear 32 thereby disengaging the pinion gear from the spool shaft 16 such that the spool shaft 16 is free to rotate with respect to the pinion gear 32. The clutch mechanism 13 includes the recesses formed on the end surface of the engaging portion 32b of the pinion gear 32 and the clutch pin 16a.

As shown in FIG. 2, the thumb rest 17 is disposed on a back portion of the spool 12 between the pair of the side plates 8 and 9. The thumb rest 17 serves as a clutch operation lever and is supported on a shaft 17a. Elongated holes (not shown) are provided with the side plates 8 and 9 of the frame 5 such that the shaft 17a extends through the elongated holes of the side plates 8 and 9. Although not shown, the shaft 17a of the thumb rest 17 is connected to a clutch yoke 40 (a cam member). Movement of the shaft 17a along the length of the elongated holes causes movement of the clutch yoke 40 parallel to the axis of the spool shaft 16. The clutch yoke 40, shaft 17a and thumb rest 17 are all part of the clutch switching mechanism 19. Although not depicted, the clutch switching mechanism 19 includes moving linkage between the handle shaft 30 and the clutch yoke 40 such that rotation of the handle shaft 30 causes engagement of the clutch mechanism 13 where the chalk 40 is urged to move the pinion gear 32 into engagement with the pin 16a thereby ensuring rotation of the spool shaft 16.

In the above described configuration, the pinion gear 32 is normally located in a clutch engagement position so that the engaging portion 32b is engaged with the clutch pin 16a with the spool shaft 16 in a clutch-on state. On the other hand, when the pinion gear 32 is moved outwardly (toward the right side of FIG. 2) by the clutch yoke 40, the engaging portion 32b is disengaged from the clutch pin 16a to enter a clutch-off state. On the other hand, when the pinion gear 32 is moved outwardly (toward the right side of FIG. 2) by the clutch chalk 40, the engaging portion 32b is disengaged from the clutch pin 16a to enter a clutch-off state. Configuration of the Centrifugal Braking Mechanism As shown in FIG. 3, the centrifugal braking mechanism 23 includes a brake case 50, a rotating member 51, a brake housing 52, a plurality of pivoting brake members 53, and an adjusting mechanism 55. The rotating member 51 is disposed within the brake case 50 and is fitted onto a portion of the spool shaft 16 for rotation together with the spool 12. The brake housing 52 is disposed within the brake case 50 but is axially movable along the spool rotation axis, as is described in greater detail below.

The plurality of pivoting brake members 53 are pivotally supported on the rotating member 51 such that centrifugal forces due to rotation of the rotating member 51 urge the pivoting brake members 53 radially outward. In this embodiment, there are six of the plurality of pivoting brake members 53, however it is possible to construct the centrifugal braking mechanism 23 with either a greater number or smaller number of pivoting brake members 53. The adjusting mechanism 55 is a mechanism for positioning the brake housing 52 within the brake case 50 at predetermined positions along the spool rotation axis, as is described below.

The brake case 50 has a short cylindrical shape and a bearing accommodating portion 50a that has a cylindrical shape and is formed at a central portion of the brake case 50. The bearing 35a for supporting the spool shaft 16 is accommodated in the bearing accommodating portion 50a and a friction plate 22a of the casting control mechanism 22 is attached thereto.

As shown in FIG. 2, the brake case 50 is fixed to the first side cover 6 by a screw 60. That is, once attached to the first side cover 6, the brake case 50 forms a part of the reel body 1. Also, a locating snap ring 61 is attached to an outer periphery of the tip of the bearing accommodating portion 50a. The locating snap ring 61 retains in position an end of a returning spring 72. The returning spring 72 forms a part of the adjusting mechanism 55, as is described further below.

The bayonet mechanism 14 includes three circumferentially spaced apart projecting portions 14a formed on an outer peripheral surface of the brake case 50. Also, three circumferentially spaced apart claws 8b are disposed on the inner surface of the opening 8a at a positions corresponding to the positions of the projecting portions 14a. The claws 8b project radially inwardly from the surface of the opening 8a. The first side cover 6 and brake case 50 may be removed from the side plate 8 by rotating thereby bringing the projecting portions 14a out of circumferential alignment with the claws 8b.

Figure 5:
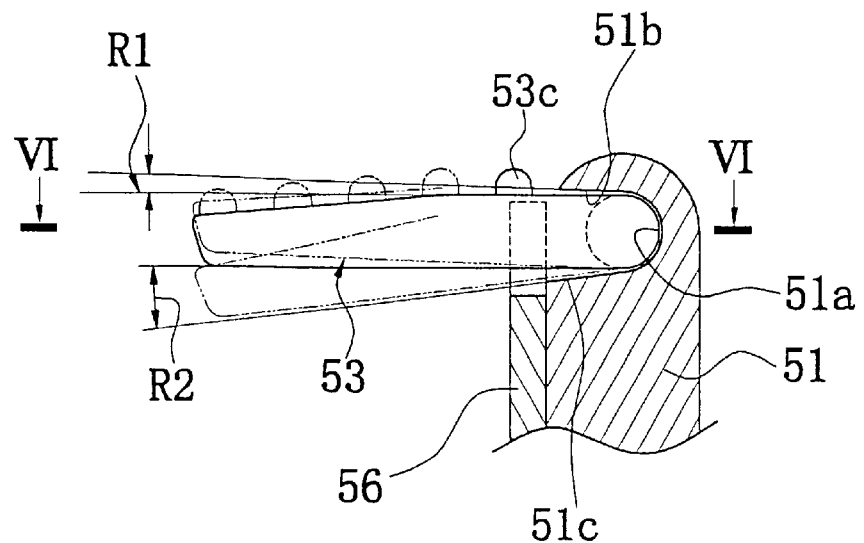
FIG. 5 is a fragmentary cross-sectional view of a portion of the double bearing reel depicted in FIGS. 1, 2, 3 and 4 showing one of a plurality of pivoting brake members, the pivoting brake members being circumferentially spaced apart from one another.
Figure 6:
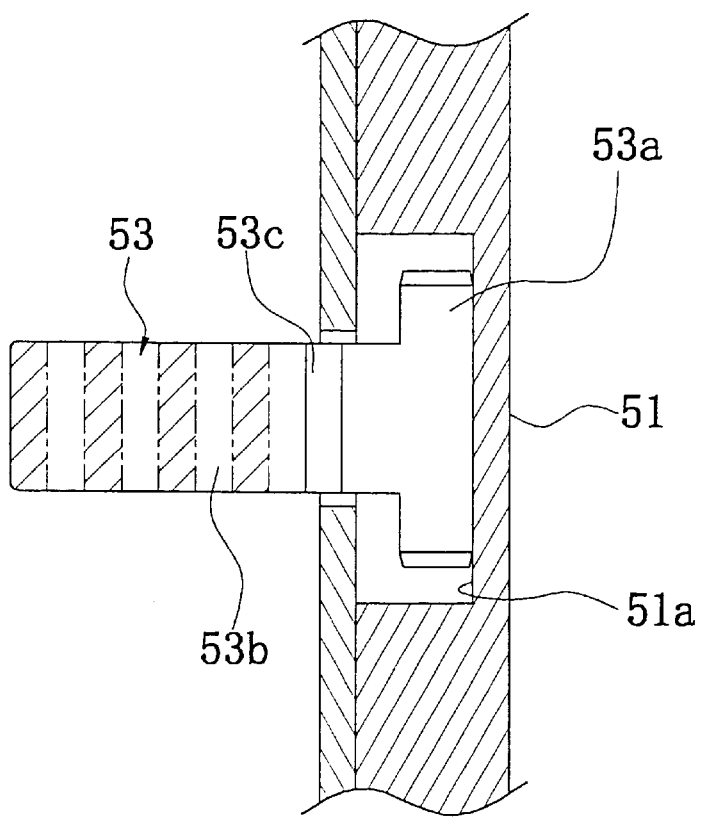
FIG. 6 is a cross-sectional view cut taken along the line VI—VI in FIG. 5.

The rotating member 51 is a disc-shaped member that is connected to the spool shaft 16 by serrations or gear teeth such that the spool shaft 16 and rotating member 51 are not rotatable with respect to one another. In this embodiment, six concave attachment portions 51a are provided at circumferentially spaced apart locations adjacent to an outer peripheral surface of the rotating member 51. Each of the concave attachment portions 51a is open in to an axial face of the rotating member 51, as shown in FIGS. 3, 5 and 6. Each of the concave attachment portions 51a is an opening having a predetermined axial depth parallel to an axis of rotation of the spool 12. A bottom surface of each concave attachment portion 51a having a half-circular shape, as seen in FIG. 5.

One end of each of the pivoting brake members 53 extends into a corresponding one of the concave attachment portions 51a, with the pivoting brake members 53 retained for pivotal movement within the concave attachment portions 51a. A plate 56 is fixed to an axial surface of the rotating member 51, as shown in FIGS. 5 and 6, by a screw shown in FIG. 3. The plate 56 is formed with a plurality of circumferential notches or recesses through which a portion of each of the pivoting brake members 53 extends, as shown in FIG. 6. The pivoting brake members 53 are retained in the concave attachment portions 51a by the plate 56.

A radially outward surface of each of the concave attachment portions 51a is inclined radially outward by an angle R1, as shown in FIG. 5. The angle R1 is measured with respect to a line that is parallel to the rotational axis of the spool shaft 16. Also, the radially inward surface of each of the concave attachment portions 51 is inclined radially inward by an angle R2, as shown in FIG. 5. The angle R1 is also measured with respect to a line that is parallel to the rotational axis of the spool shaft 16. The inclined radially inward and outward surfaces of each concave attachment portion 51a are provided to limit radial angular inclination of each of the respective pivoting brake members 53. The angle R1 is preferably in the range of 3° to 5° and the angle R2 is preferably in the range of 5° to 9°. The angle R1 is determined so that the position of a tip end of each of the respective pivoting brake members 53 would extend into the brake liner 57 fixed to inside the brake housing 52. Further, the angle R1 is dimensioned to insure that the pivoting brake members 53 can easily engage the brake liner 57 when the brake liner 57 is moved into position for engagement with the pivoting brake members 53.

Each of the pivoting brake members 53 is pivotally provided within respective concave attachment portions 51a of the rotating member 51. As shown in FIGS. 5 and 6, each pivoting brake member 53 includes a shaft portion 53a, a moving portion 53b, and a contact portion 53c in one of a plurality of positions. The shaft portion 53a is disposed in the concave attachment portion 51a. The moving portion 53b extends from the shaft portion 53a outwardly in a direction generally parallel to the rotational axis of the spool 12. The contact portions 53c are provided positioned at various locations on the moving portion 53b of pivoting brake member 53 such that each contact portion 53c extends radially outward with respect to the rotational axis of the spool 12.

Figure 7:
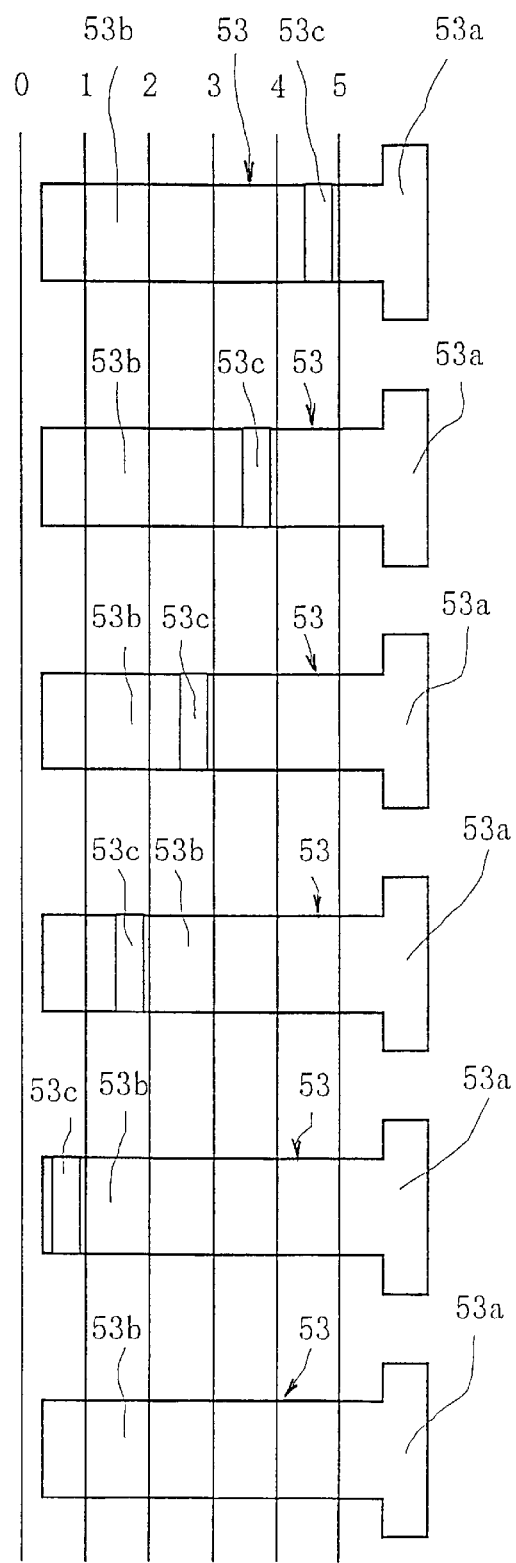
FIG. 7 is a schematic diagram showing several of the pivoting brake members laid out linearly to demonstrate which ones make contact with a brake liner during the adjustment of braking force.

However, as shown in FIG. 7, the position of the contact portions 53c on each respective pivoting brake members 53 differ from the other pivoting brake members 53. Specifically, in FIG. 7, the pivoting brake members 53 are laid out flat side by side. The pivoting brake member 53 at the top of FIG. 7 has a contact portion 53c at position 5. The next pivoting brake member 53 in FIG. 7 has a contact portion 53c at position 4. The next pivoting brake member 53 in FIG. 7 has a contact portion 53c at position 3. The next pivoting brake member 53 in FIG. 7 has a contact portion 53c at position 3, and so on. However, the last pivoting brake member 53 at the bottom if FIG. 7 has no contact portion. The last pivoting brake member 53 having no contact portion 53c is provided in order to maintain rotational balance. The five positions of the contact portions 53c are equally spaced apart from one another with respect to the rotational axis of the spool 12. It should be understood that FIG. 5 shows a composite of all of the pivoting brake members 53 such that all of five of the contact portions 53c are visible. However, only one contact portion 53c is formed on any one of the pivoting brake members 53 having a contact portion.

As is indicated in FIG. 5, a portion of the surface of the moving portion 53b of each of the pivoting brake members 53 is slightly inclined radially inwardly with respect to the rotational axis of the spool 12 in order to prevent the tip end of each pivoting brake member 53 from contacting the brake liner 57 of the brake housing 52 when the pivoting brake member 53 is urged radially outwardly. In other words, only the contact portion 53c makes contact with the brake liner 57 of the brake housing 52 in order to provide a braking force to the spool 12.

As shown in FIG. 3, the brake housing 52 includes an inner portion 52a, an outer portion 52b, and a middle portion 52c.

The inner portion 52a of the brake housing 52 is supported by the bearing accommodating portion 50a such that the brake housing 52 is movable in the axial direction along the outer surface of the bearing accommodating portion 50a. The outer portion 52b of the brake housing 52 is engaged with the inner surface of the brake case 50 so as to be movable in the axial direction but is non-rotatable with respect to the brake case 50. The middle portion 52c extends between the inner portion 52a and the outer portion 52b. The brake liner 57 is fixed to the inner surface of the outer portion 52b as shown in FIG. 3. The contact portions 53c of the various pivoting brake members 53 make contact with the inner surface of the brake liner 57 depending upon the position of the brake housing 52 and brake liner 57, as is described below. The end of the brake liner 57 has a tapered surface 57a so as to make an increase in height from an inner radial inner side to an outer radial side more gradual, as shown in FIG. 3. The pivoting brake members 53 are smoothly guided to the inner side of the brake liner 57 due to the presence of the tapered surface 57a.

A second end of the returning spring 72 contacts a bottom surface of the inner portion 52a. For this reason, the brake housing 52 is always urged outwardly in the axial direction away from the spool 12. A pair of stop pins 62 that extend radially outward from opposite sides of the brake housing 52. The pair of stop pins 62 extend into and are engaged with a pair of grooves 50b formed on the inner surface of the brake case 50, as shown in FIG. 3, such that the brake housing 52 is attached to the brake case 50 in a non-rotatable manner but is movable in an axial direction with respect to the rotational axis of the spool 12.

The brake housing 52 is formed with at least two first cams 63 that extend outwardly in the axial direction relative to the spool 12. The first cams 63 have a substantially triangular shape and form a part of the adjusting mechanism 55, as is described further below.

Figure 4:
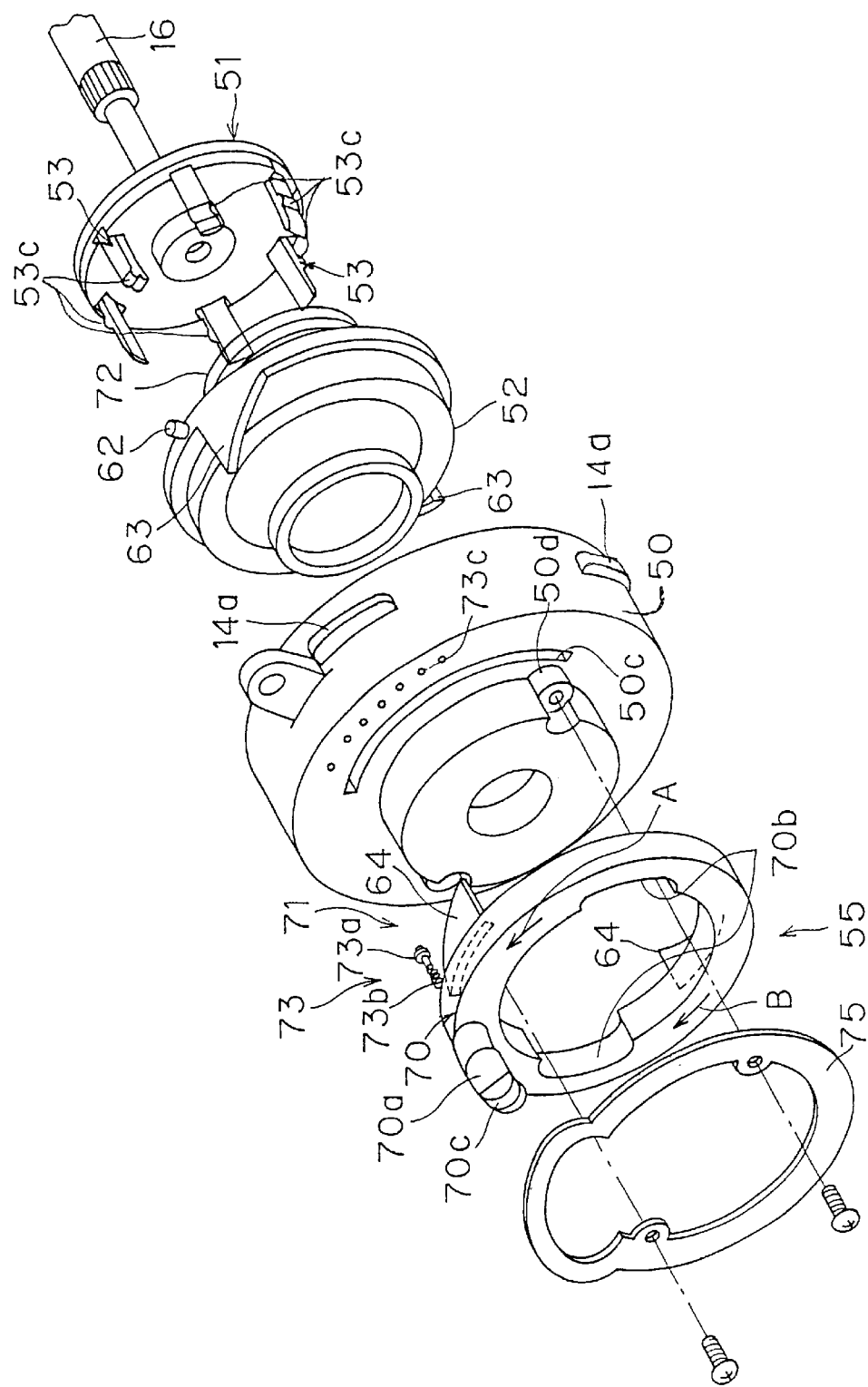
FIG. 4 is an exploded perspective view of the centrifugal braking mechanism depicted in FIG. 3.

As shown in FIG. 4, the adjusting mechanism 55 includes a rotatable ring member 70, a cam mechanism 71, and the returning spring 72.

The rotatable ring member 70 is rotatably retained between the brake case 50 and a pressing plate 75 that is described in greater detail below.

The cam mechanism 71 converts the rotational movement of the rotatable ring member 70 to axial movement of the brake liner 57 in a manner described in greater detail below. The returning spring 72 urges the brake housing 52 axially outward against the cam mechanism 71.

The rotatable ring member 70 is a ring-shape member that rotatably contacts the outer surface of the brake case 50. A knob portion 70a is formed on the outer surface of the rotatable ring member 70. The knob portion 70a is positioned to extend axially outwardly in a direction parallel to the rotational axis of the spool 12. A projecting portion 70c is formed on the central portion of the knob portion 70a so as to extend through an oblong opening in the surface of the first side cover 6.

As the rotatable ring member 70 is rotated to various positions (described further below) the projecting portion 70c becomes aligned with numbers 0 through 5 (not shown) printed on the surface of the first side cover 6 adjacent to the oblong opening to provide an indication of the position of the rotatable ring member 70 thereby indicating the strength of braking force applied to the spool 12. A pair of rotation controlling concave portions 70b are formed on a radially inner periphery of the rotatable ring member 70 for limiting rotational movement of the rotatable ring member 70 with respect to the brake case 50.

A positioning mechanism 73 is provided on the rotatable ring member 70 for aligning the rotatable ring member 70 with a predetermined rotational displacement angle corresponding to one of six different positions relative to the brake case 50.

The positioning mechanism 73 includes a positioning pin 73a, a coil spring 73b, and concave positioning holes 73c. The positioning pin 73a is attached to the rotatable ring member 70 movably in the spool axis direction. The coiled spring 73b urges the positioning pin 73a toward the adjacent surface of the brake case 50. There are six concave positioning holes 73c in the depicted embodiment corresponding to the number of pivoting brake members 53. The concave positioning holes 73c are formed on the axial side surface of the brake case 50 at circumferentially spaced apart positions.

Second cams 64 are formed on one side surface of the rotatable ring member 70 and form part of the cam mechanism 71. Each of the second cams 64 is formed at a position corresponding to the position of the respective first cam 63, and has a triangular oblique shape. The rotational movement of the rotatable ring member 70 is converted into axial movement of the brake housing 52 due to contact between the first and second cams 63 and 64. Both the first and the second cams 63 and 64 extend through a pair of cam openings 50c formed in the brake case 50. Each of the cam openings 50c has an arcuate shape to accommodate a corresponding arcuate shape of the first and second cams 63 and 64.

The rotatable ring member 70 is compressed against the brake case 50 by a pressing plate 75. The pressing plate 75 compresses the rotatable ring member 70 by means of screws, each of which is tighten against a respective screw base portion 50*d* formed on the outer side surface of the brake case 50. The screw base portion 50*d* protrudes radially outward. The range of the rotational angle of the rotatable ring member 70 is predetermined by the screw base portions 50*d* which stops the movement of the rotatable ring member 70 by contacting surfaces of respective rotation controlling concave portions 70*b*.

In the adjusting mechanism 55 having the abovedescribed configuration, using the knob portion 70*a*, when the rotatable ring member 70 is rotated in a direction indicate by an arrow A in FIG. 4, the brake housing 52 is moved toward the rotating member 51 due to the interaction between the first and second cams 63 and 64. As a result, the number of pivoting brake members 53 that are able to contact with the brake liner 57 is increased and the braking force is correspondingly increased. On the other hand, when the rotatable ring member 70 is rotated in the direction indicated by an arrow B in FIG. 4, the number of pivoting brake members 53 that are able to contact with the brake liner 57 is decreased and the braking force is reduced since the brake housing 52 is moved away from the rotating member 51 due to an urging force of the returning spring 72. When the brake liner 57 moves to a position where all of the contact portions 53*c* on the pivoting brake members 53 are spaced apart from the brake liner 57, no braking force is exerted.

FIG. 7 shows the various stages of possible brake force that can be applied by the pivoting brake members 53 on the brake liner 57. For instance, when the brake liner 57 is located at a most advanced position shown in the right hand side of FIG. 7, as indicated by the number 5, the largest possible braking force is possible since all the contact portions 53*c* are in a position to make contact with the brake liner 57. On the other hand, when the brake liner 57 is located at a position corresponding to 0 at the left hand side of FIG. 7, no braking force can be generated because none of the contact portions 53*c* are able to make contact with the brake liner 57. In this embodiment, the number of the pivoting brake members 53 may be adjusted one by one such that any incremental number between 0 and 6 may be selected, the incremental number corresponding to the number of contact portions that may make contact with the brake liner 57.

Since the pivoting brake members 53 extend in an axial direction but may pivot in a radially outward direction relative to the rotational axis of the spool 12, a relatively large centrifugal force is exerted on the pivoting brake members 53. As a result, a large braking force may be obtained. Further, six distinctively different levels in the braking force may be selected during adjustment of the braking force since the braking force is digitally adjusted (i.e., stepwise) by changing the number of the contact portions on respective pivoting brake members 53 that are able to contact with the brake liner 57. Operation of reel In a normal operating state, the clutch yoke 40 is pressed inwardly and, hence, a clutch-on state is attained and the spool 12 can be rotated by rotation of the handle 2. Specifically, rotational force applied to the handle 2 is transmitted to the spool 12 via the handle shaft 30, the main gear 31, the pinion gear 32 and the spool shaft 16 to rotate the spool 12 in the line-winding direction. As the spool 12 rotates, centrifugal forces are exerted on the pivoting brake members 53 of the centrifugal braking mechanism 23 to move the pivoting brake members 53 radially outwardly. However, since the rotation speed of the spool 12 is typically low when winding in a fishing line, the braking force created by contact between the pivoting brake members and the brake liner 57 is correspondingly low. Hence, the braking force created under such conditions does not interfere with the rotation of the handle 2. However, should it be necessary to reduce the braking force, the brake housing 52 may be positioned at position 0 by rotating the rotatable ring member 70 in the direction indicated by the arrow B in FIG. 4 using the knob portion 70*a*. As a result, the brake liner 57 is positioned such that none of the pivoting brake members 53 are able to make contact with the brake liner 57 and there is no braking force by the centrifugal braking mechanism 23 is exerted on the spool 12.

When a fishing line to be cast out, the clutch mechanism 13 is changed to a disengaged state by pressing the thumb rest 17 downward thereby moving the engaging portion 32*b* out of contact with the pin 16*a*. The spool 12 may rotate in order to cast out the fishing line. As the spool 12 rotates, braking force applied to the spool 12 by contact between the pivoting brake members 53 and the brake liner 57. The braking force is adjustable to a desired level by a user to prevent backlash by rotating the rotatable ring member 70 via manipulation of the knob portion 70*a*. As the brake housing 52 is gradually moved toward the rotating member 51 by rotating the rotatable ring member 70 in the direction indicated by the arrow A (FIG. 4), the number of the pivoting brake members 53 which are able to make contact with the brake liner 57 is increased. As a result, the braking force exerted by the centrifugal braking mechanism 23 is gradually increased. When the brake liner 57 reaches the most advanced position, all the pivoting brake members 52 are able to make contact with the brake liner 57 and the braking force is able to reach a maximum level in response to centrifugal forces.

Once the fishing line is cast out, the user rotates the handle in order to engage the clutch mechanism 13 and rotate the spool 12 thereby winding in the fishing line.

In this embodiment, the thumb rest 17 is movable in a downward direction (with respect to FIGS. 1 and 2) in order to disengage the clutch mechanism 13. Due to the movement of the thumb rest 17, the clutch yoke 40 and the pinion gear 32 are moved outwardly to disengage the clutch mechanism 13. In the disengaged state, the rotation from the handle shaft 30 is not transmitted to neither the spool 12 nor the spool shaft 16 and the spool 12 may freely rotate. When a fishing rod is swung in the clutch disengaged state so that the reel is inclined in the axis direction in order for the spool shaft 16 to face a vertical surface while thumbing the spool using a thumb on the thumb rest 17, a lure is cast and the spool 12 rotates vigorously in the line-releasing direction.

In this state, the spool shaft 16 is rotated in the line-releasing direction by the rotation of the spool 12, and the rotation is transmitted to the rotating member 51. When the rotating member 51 is rotated, the pivoting brake members 53 make contact with the brake liner 57 and the spool 12 is braked by the centrifugal braking mechanism 23 to prevent a generation of backlash.

However, even if some backlash of the spool 12 occurs resulting in a fishing line tangle, the first side cover 6 is easily removed due to the bayonet structure 14. Once the first side cover 6 is removed, the spool 12 may also be removed and a tangle may be untangled.

Moreover, if the lure is changed to one having a different weight, the braking force may be adjusted in accordance with the weight of the lure, by rotating the rotatable ring member 70 using the knob portion 70*a*. In this embodiment, the braking force is easily adjusted by simply rotating the rotatable ring member 70 using the knob portion 70*a* which is exposed to outside of the reel. Further, in accordance with the present invention, a large braking force is obtained and the difference in the braking force becomes distinctive when it is adjusted.

Alternate Embodiments (a) Although the brake housing 52 is moved in the axial direction in the above embodiment, the rotating member 51 may alternatively be moved in the axial direction in order to adjust the level of the braking force.

(b) Although the brake housing 52 is moved by using the cam mechanism in the above embodiment, the position of the brake housing 52 may be adjusted by other means (other than cams), for instance, a screw driven mechanism may be utilized.

Figure 8:
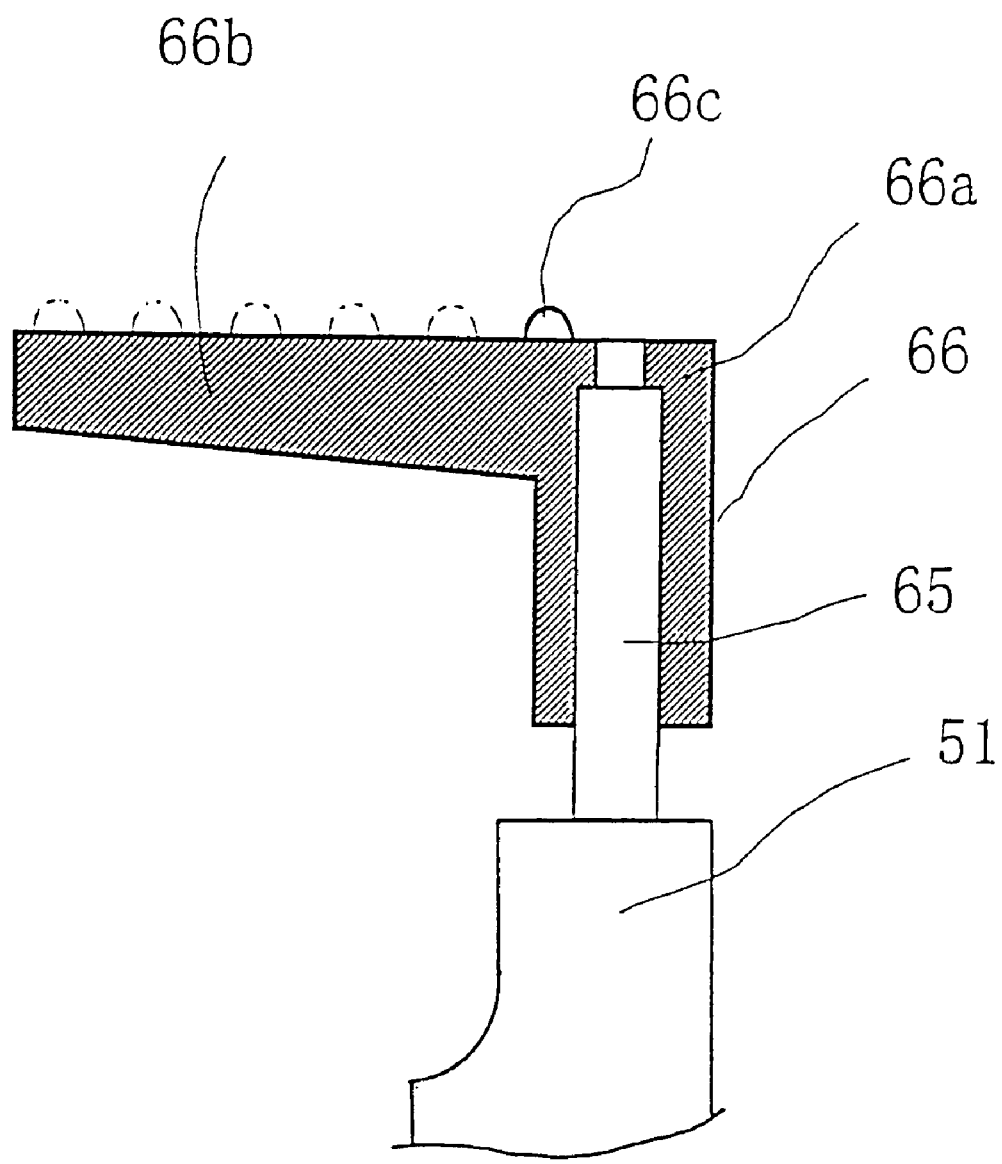
FIG. 8 is similar to FIG. 5 showing a pivoting brake member in accordance with an alternate embodiment of the present invention.

(c) Although the pivoting brake members 53 are movably provided with the rotating member 51 in the above embodiment, sliding brake members 66 may be provided on the rotating member 51 movably in the radius direction as shown in FIG. 8. In this case, a plurality of guiding shafts 65, for instance six, have a square cross-section to prevent rotation of the sliding brake members 66 on the guiding shafts 65. The guiding shafts 65 extend radially outward and are circumferentially spaced apart from one another on an outer periphery of the rotating member 51. Each of the sliding brake members 66 is fitted on a respective one of the guiding shafts 65 such that the sliding brake members 66 may move radially outward but may not rotate about the respective guiding shaft 65.

Each of the sliding brake members 66 includes a guiding portion 66a, a brake portion 66b, and one contact portion 66c. The guiding portion 66a has a cylindrical shape and is fitted onto the respective guiding shaft 65. The brake portion 66b extends in the axial direction from the guiding portion 66a. The contact portion 66c is disposed on the outer surface of the brake portion 66b and extends radially outward. As in the above-mentioned embodiment in FIGS. 1–7, there is only one contact portion 66c formed on any single sliding brake member 66. However, as indicated in phantom lines in FIG. 8, each contact portion 66c is located at a different position in the axial direction relative to the rotational axis of the spool 12. As with the embodiment in FIGS. 1–7, the alternate embodiment in FIG. 8 is such that as the brake liner 57 is adjustably moved toward the rotating member 51, the level of braking force may be increased in a step-wise fashion as, one by one, the various contact portions 66c are able to contact the brake liner 57.

In this alternate embodiment the adjustment of the braking force is easy since the number of the sliding brake members 66 which are able to make contact with the brake liner 57 is readily changeable by operating the adjusting mechanism 55 in the same manner as in the first embodiment (in FIGS. 1–7). Also, a large braking force is obtainable since the sliding brake members 66 are moved radially outwardly by the centrifugal forces. Moreover, a distinctive difference in the braking force may be obtained by the adjustment since the braking force is adjusted stepwise by changing the number of the contact portions 66c which make contact with the brake liner 57.

Effect of the Invention

According to the present invention, the adjustment of the braking force may be easily carried out since the number of the pivoting brake members which are able to make contact with the braking liner is readily varied by operating the moving mechanism. Also, a large braking force is obtained since the pivoting brake members are moved outwardly in the radial direction by the centrifugal forces. Moreover, a distinctive difference in the braking force may be obtained by an adjustment since the braking force is adjusted stepwise by changing the number of the contacting portions which make contact with the braking liner.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. For a double-bearing reel having a reel housing and a spool rotatably supported within the reel housing, a centrifugal braking device for applying centrifugal braking force to the spool, the centrifugal braking device comprising:

a rotor coupled to the spool for rotation therewith;

a circumferentially spaced plurality of brake member support means formed on said rotor;

brake members pivotally supported on said brake member support means such that when the spool rotates said brake members pivot under centrifugal force radially outward with respect to said rotor;

braking contact portions disposed on each of said brake members such that each contact portion is in a different position axially relative to the spool;

a cylindrical brake housing lined with a brake liner and non-rotatably supported in said reel housing; and means for selectively axially shifting said brake housing between a retracted position wherein the brake liner is apart from each of said contact portions such that none comes into braking contact with the brake liner when said brake members pivot under centrifugal force, and a contact position wherein at least one of said contact portions comes into braking contact with the brake liner when said brake members pivot under centrifugal force.

2. A centrifugal braking device as set forth in claim 1, wherein means for selectively positioning said brake housing comprises:

a rotatable ring member rotatably supported on said reel housing, said ring member having a first cam contacting a second cam on said brake housing such that rotation of said rotatable ring member changes the axial position of said brake housing relative to said spool; and an urging member contacting said brake housing for urging said brake housing in an axial direction away from said rotating member.

3. A centrifugal braking device as set forth in claim 2, wherein said rotatable ring member is formed with a knob portion that extends in an axial direction, said knob portion extending through an opening in a side cover of said reel housing for operating said means for selectively positioning said brake housing.

4. A centrifugal braking device as set forth in claim 3, wherein means for supporting said plurality of brake members on said rotating member comprises a plurality of concave portions formed in an axial face of said rotating member proximate a radially outer periphery thereof, a portion of each of said brake members being retained for pivotal movement in said concave portions.

5. A centrifugal braking device as set forth in claim 4, wherein each of said concave portions include angle controlling means for controlling angular displacement of each of said brake members with respect to pivotal movement thereof, such that radially outward movement of a tip end of each of said brake members is confined within a space defined by an inner radius of said brake housing.

6. A centrifugal braking device as set forth in claim 3, wherein means for supporting said plurality of brake members on said rotating member comprises a plurality of radially extending shafts fixed to said rotating member, and each of said brake members is disposed on a corresponding one of said shafts such that said brake members may undergo movement in radial directions relative to said spool and said brake members are confined against rotational movement with respect to said shafts.

7. A centrifugal braking device as set forth in claim 3, wherein said brake housing includes a brake liner fixed to an inner radial surface of said brake housing, said brake liner for contacting said contact portions on each of said brake members.

8. A centrifugal braking device as set forth in claim 1, wherein said brake member support means are formed on said rotor in positions axially staggered with respect to the spool.

9. For a double-bearing reel having a reel housing and a spool rotatably supported within the reel housing, a centrifugal braking device for applying centrifugal braking force to the spool, the centrifugal braking device comprising:

a rotor coupled to the spool for rotation therewith;

a circumferentially spaced plurality of brake member support means formed on said rotor;

brake members shiftably supported on said brake member support means such that when the spool rotates said brake members each shift under centrifugal force along a direction having a radially outward component with respect to said rotor;

braking contact portions disposed on each of said brake members so as to differ in axial position with respect to the spool;

a brake housing lined with a cylindrical brake lining and supported in said reel housing coaxially with said rotor; and means for selectively changing axial position of said brake housing relative to said rotor, between a non-contact position wherein none of said contact portions comes into braking contact with the brake lining when said brake members shift under centrifugal force, and a contact position wherein at least one of said contact portions comes into braking contact with the brake lining when said brake members shift under centrifugal force.

10. A centrifugal braking device as set forth in claim 9, wherein said brake members are pivotally mounted on said brake member support means.

11. A centrifugal braking device as set forth in claim 9, wherein said brake member support means are formed on said rotor in the same position axially relative to the spool.

12. A centrifugal braking device as set forth in claim 11, wherein said brake members are pivotally mounted on said brake member support means.

* * * * *